US012600437B2

(12) United States Patent
Miwa et al.

(10) Patent No.: US 12,600,437 B2
(45) Date of Patent: Apr. 14, 2026

(54) WEIGHT RELEASE DEVICE

(71) Applicants: JAPAN AGENCY FOR MARINE-EARTH SCIENCE AND TECHNOLOGY, Yokosuka (JP); Okamoto Glass Co., Ltd., Kashiwa (JP)

(72) Inventors: Tetsuya Miwa, Yokosuka (JP); Kazumasa Ikeda, Kashiwa (JP); Takahiro Kubota, Kashiwa (JP); Atsushi Arai, Kashiwa (JP); Yasuyuki Murakami, Tsurugashima (JP)

(73) Assignees: JAPAN AGENCY FOR MARINE-EARTH SCIENCE AND TECHNOLOGY, Yokosuka (JP); Okamoto Glass Co., Ltd., Kashiwa (JP)

( * ) Notice: Subject to any disclaimer, the term of this patent is extended or adjusted under 35 U.S.C. 154(b) by 424 days.

(21) Appl. No.: 18/276,042

(22) PCT Filed: Mar. 3, 2022

(86) PCT No.: PCT/JP2022/009060
§ 371 (c)(1),
(2) Date: Aug. 7, 2023

(87) PCT Pub. No.: WO2022/209560
PCT Pub. Date: Oct. 6, 2022

(65) Prior Publication Data
US 2024/0101235 A1     Mar. 28, 2024

(30) Foreign Application Priority Data

Apr. 1, 2021     (JP) ................................. 2021-062707

(51) Int. Cl.
B63B 22/06 (2006.01)
B26F 3/08 (2006.01)
(Continued)

(52) U.S. Cl.
CPC ................ B63B 22/06 (2013.01); B26F 3/08 (2013.01); B63B 22/24 (2013.01);
(Continued)

(58) Field of Classification Search
CPC ..... B63G 8/001; B63B 2211/02; B63B 22/24; B63B 22/06; B63B 2209/00; B26F 3/08; G01V 1/18; H05B 3/06
(Continued)

(56) References Cited

U.S. PATENT DOCUMENTS 6,719,496 B1     4/2004   Von Eberstein
2014/0315451 A1   10/2014   Hatakeyama
(Continued)

FOREIGN PATENT DOCUMENTS

CA     2424446 C     10/2004
CN     202522148 U   11/2012
(Continued)

OTHER PUBLICATIONS

CN-210391519-U Translation (Year: 2020).*
(Continued)

*Primary Examiner* — S. Joseph Morano
*Assistant Examiner* — Eric Anthony Starck
(74) *Attorney, Agent, or Firm* — Yokoi & Co., U.S.A.; Toshiyuki Yokoi

(57) ABSTRACT

A weight release device capable of being operated in deep sea without accompanying a mechanical operation. The weight release device includes a housing fixed to the under-water observation device; a thread made of thermoplastic resin; electric heater portions; a weight support plate; a (Continued)

locking member of the thread made of the thermoplastic resin; and a ring for hanging the weight. The thread made of the thermoplastic resin is arranged from a start point housed in the housing, arranged to pass through the first electric heater portion, locked to the locking member of the thread made of the thermoplastic resin, arranged to pass through the second electric heater portion housed in the housing, and returned to an end point housed in the housing. The weight is released only by conducting an electricity through the electric heater portion to release the weight for floating the underwater observation device.

4 Claims, 12 Drawing Sheets

(51) Int. Cl.

| | | |
|---|---|---|
| *B63B 22/24* | (2006.01) | |
| *G01V 1/18* | (2006.01) | |
| *H05B 3/06* | (2006.01) | |
| *B63G 8/00* | (2006.01) | |

(52) U.S. Cl.
CPC ....... *B63B 2209/00* (2013.01); *B63B 2211/02* (2013.01); *B63G 8/001* (2013.01); *G01V 1/18* (2013.01); *H05B 3/06* (2013.01)

(58) Field of Classification Search
USPC ......................................................... 114/326

See application file for complete search history.

(56) References Cited

U.S. PATENT DOCUMENTS

| | | |
|---|---|---|
| 2014/0374459 A1 | 12/2014 | Hatakeyama |
| 2015/0301206 A1 | 10/2015 | Shimizu et al. |
| 2018/0044056 A1 | 2/2018 | Takahashi |
| 2020/0239116 A1 | 7/2020 | Miwa et al. |

FOREIGN PATENT DOCUMENTS

| | | | | |
|---|---|---|---|---|
| CN | 209739306 U | 12/2019 | | |
| CN | 210391519 U | * 4/2020 | | |
| JP | S49-6397 U | 1/1974 | | |
| JP | H08-271291 A | 10/1996 | | |
| JP | 2002-104294 A | 4/2002 | | |
| JP | 2004-359081 A | 12/2004 | | |
| JP | 2006-030124 A | 2/2006 | | |
| JP | 5800296 B | 10/2015 | | |
| JP | 5812486 B | 11/2015 | | |
| JP | 6253026 B | 12/2017 | | |
| JP | 2019-111941 A | 7/2019 | | |
| KR | 101406977 B1 | * 6/2014 | ............ | G01D 21/02 |
| WO | 2017/191693 A | 11/2017 | | |
| WO | 2019/131076 A | 7/2019 | | |

OTHER PUBLICATIONS

KR-101406977-B1 Translation (Year: 2014).*
International Search Report for PCT/JP2022/009060 dated Apr. 19, 2022.
PCT written opinion dated Apr. 19, 2022.
"Freefall-type deep sea exploring device Edokko-1", http://edokko1.jp/product.
"Underwater acoustic release device", Hydro System Development Inc., https://www.hydro-sys.com/detail.php?pid=64.

* cited by examiner

101

103

104

105

102 wire

WEIGHT RELEASE DEVICE

TECHNICAL FIELD

The present invention relates to a weight release device (weight detachment device) for releasing (detaching) a weight (sinker) from a buoyancy body located in the water or the bottom of the water and floating the buoyancy body on the water. The buoyancy body includes various underwater observation devices, observation devices, floating devices and the like which are incorporated in a mooring system.

BACKGROUND ART

The inventors of the present invention have been developed a pressure-resistant glass sphere (Patent document 1) capable of housing cameras, video cameras, seismometers, observation devices such as a scientific analyzer, measurement devices and the like to be used in exploration and searching of deep ocean, sea bottom, underground and thick ice of the Antarctic Continent and developed an undersea/seabed exploration device (Non-Patent Document 1) using the pressure-resistant glass sphere. Furthermore, the inventors of the present invention have also developed an underwater exploration device suitable for performing an ecological impact survey by monitoring images for a long time as a tool for evaluating ecological impact of underwater and sea bottom. Specifically, the inventors of the present invention have also developed a connectedly-formed underwater exploration device (Patent document 2 and Patent document 3) capable of coping with an extension of a battery life to photograph videos for a long term and further coping with 360 degree omnidirectional shooting and various measurements based on a free-fall-type video camera system formed by longitudinally connecting two or three transparent pressure-resistant hollow glass spheres for exploring deep sea (known as a so-called "Edokko-1").

Since the above described underwater observation device itself has the buoyancy in accordance with the volume of the underwater observation device, the underwater observation device does not descend by its own weight. Thus, a weight (sinker) having a predetermined mass (weight) is added to make the underwater observation device float in a predetermined depth, make the underwater observation device sink slowly for continuing the exploration, and make the underwater observation device reach the sea bottom (water bottom) if necessary for exploring the sea bottom.

After a predetermined observation is finished in the sea bottom (water bottom) or the undersea (underwater), the above described underwater observation device is floated on the sea (water) and collected by the mother ship. Here, in order to float the mooring system including the underwater observation device by the buoyancy of the underwater observation device itself, the weight should be released.

A weight release device used for the above described so-called "Edokko-1" and the connectedly-formed underwater exploration device will be explained using FIG. 1 and FIG. 2. In FIG. 1, 101 is a body of the connectedly-formed underwater exploration device, 102 is a weight hung down by a wire, and a weight release device 103 is installed between the body of the connectedly-formed underwater exploration device and the weight. In the weight release device, a cantilever 105 is fixed by a thread 106 made of a thermoplastic resin to a housing which is fastened by a bolt to the body of the connectedly-formed underwater exploration device. When releasing the weight, the signal for releasing the weight is transmitted from a transponder sphere (sphere for transmitting instruction) of the body of the connectedly-formed underwater exploration device to an electric heater portion 104 via the underwater cable. Then, an electricity is conducted through an electric heater coil located inside the electric heater portion and the thread made of the thermoplastic resin is cut by the heat generated by the electricity. When the thread 106 made of the thermoplastic resin is cut, the cantilever 105 from which the weight 102 is hung opens and the ring of the wire hanging the weight is released from the cantilever. Thus, the weight is released.

However, in the above described conventional weight release device, there is a trouble that the underwater observation device does not float to the sea surface in some cases even when the signal of releasing the weight is transmitted actually. Although the reason of the above described trouble is not identified since the body of the underwater observation device does not float and cannot be collected, the trouble in an electric system and the trouble in a mechanical operation of the weight release device can be considered. More specifically, it is assumed that there is a trouble that the cantilever is not opened even when the thread made of the thermoplastic resin is electrically cut.

As for the device for floating the underwater observation device, Japanese Patent No. 6253026 and Japanese Patent No. 5800296 disclose the device for releasing an anchor (weight) installed on the bottom portion of the spherical underwater observation device wherein alternating current electric power flows and a closed-loop member is melt-cut (cut by melting). Thus, the constraint of a turning arm provided on the sphere is released, the turning arm is rotated in the direction of separating from the body of the underwater observation device by the tension of an anchor connecting member, an anchor locking ring is released from the turning arm, and an underwater observation device is floated. However, the above described device uses the structure of releasing a box-shaped anchor (weight) installed on the spherical underwater observation device. Thus, it is difficult to use the above described device for the purpose of releasing a small and compact underwater observation device.

In the weight release device used for the above described underwater observation device, the melting device disclosed in Japanese Patent No. 5812486 can be used as the mechanism for melt-cutting the thread.

As for the other release devices, Patent document 7 discloses a method where an engagement of a fixing/engaging member and a cable for connecting an underwater observation device with an underwater fixing tool is released by moving a piston with the pressure of injecting gas into a sealed chamber and cutting the cable by a cutting blade and Patent document 8 discloses an electric corrosion method where a metal plate or a metal line for connecting a spherical buoyancy body with a weight is cut by electrically corroding the metal plate or the metal line forcibly. In the above described methods, there is a problem in the operation performance. For example, the size becomes large due to the weight increase and it is difficult to predict the time of the cutting. Thus, it is difficult to use the above described methods for the purpose of separating a small and compact underwater observation device.

Furthermore, another release device is disclosed in Patent document 9.

Although the details of the above described release device are unknown, the release device is actuated when the mother ship transmits the signal. This has a mechanism of opening a release hook to release a chain to which the weight is attached. In the above described release device, it is assumed that the release hook is not operated because of the mechanical trouble and an underwater measurement device cannot be collected.

Note that the release device of opening/closing the hook is commercialized as an underwater acoustic release device (Non-Patent Document 2).

According to the document, the maximum hanging load (i.e., maximum releasing load) is large (e.g., 2,000 kg or 4,540 kg) and the device is large and heavy. Although some devices are slightly small, the maximum hanging load is 455 kg (maximum releasing load is 180 kg). As the greatest fault, these devices can be used only in the coastal area and the maximum depth of 500 m.

CITATION LIST

Patent Literature

[Patent document 1] WO/2017/191693
[Patent document 2] Japanese Unexamined Patent Application Publication No. 2019-111941
[Patent document 3] WO/2019/131076
[Patent document 4] Japanese Patent No. 6253026
[Patent document 5] Japanese Patent No. 5800296
[Patent document 6] Japanese Patent No. 5812486
[Patent document 7] Japanese Unexamined Patent Application Publication No. H08-271291
[Patent document 8] Japanese Unexamined Patent Application Publication No. 2006-30124
[Patent document 9] Japanese Unexamined Patent Application Publication No. 2004-359081

Non-Patent Documents

[Non-Patent Document 1] http://edokko1.jp/product
[Non-Patent Document 2] https://www.hydro-sys.com/detail.php?pid=64

SUMMARY OF THE INVENTION

Problems to be Solved by the Invention

As described in the background art, general weight release devices used under water are large, durable to force of several tons, and capable of being released. The above described devices are used in various ways such as military, scientific field and ocean civil engineering. For example, the above described devices are used for installing sea mine for military purposes, installing fish live box for fishery purposes, and installing underwater observation device and buoy in scientific field. However, there is no conventional weight release device capable of observing costal area to deep sea by fixing a small observation device of approximately 100 kg or less by the weight and releasing the weight for floating and collecting the observation device after the observation.

Patent document 2 and Patent document 3 disclose the method of softening and melt-cutting the thread made of the thermoplastic resin by the electric heater. However, it is worried that the hanging strength of the thread is weak. Therefore, using the principle of leverage, the distance from the cantilever to the thread made of the thermoplastic resin is kept long to reduce the load applied to the thread. However, since the principle of leverage is used, the components of the cantilever are required and the mechanical operation is required.

The purpose of the present invention is to provide a weight release device (1) operated only by melt-cutting the thread made of the thermoplastic resin without accompanying mechanical operation at all to avoid the troubles and risks of the mechanical operation occurred in the conventional weight release device, (2) smaller and more compact compared to the conventional weight release device and (3) operated in deep sea similar to the conventional weight release device.

Means for Solving the Problem

In order to solve the above described conventional problems, the present invention provides a weight release device for releasing a weight attached to an underwater observation device having buoyancy, wherein the weight release device including: a housing fixed to the underwater observation device; a thread made of thermoplastic resin, a start point and an end point of the thread being housed in the housing; a first electric heater portion; a second electric heater portion; a weight support plate; a locking member of the thread made of the thermoplastic resin; and a ring for hanging the weight, the thread made of the thermoplastic resin is arranged from the start point housed in the housing, arranged to pass through the first electric heater portion, locked to the locking member of the thread made of the thermoplastic resin, arranged to pass through the second electric heater portion housed in the housing, and returned to the end point housed in the housing, the locking member being provided on an upper surface of the weight support plate, the ring for hanging the weight is fixed to a lower surface of the weight support plate, the weight is hung from the ring, and the weight support plate from which the weight is hung is configured to be released only by conducting an electricity through the first electric heater portion and the second electric heater portion to melt-cut the thread made of the thermoplastic resin for floating the underwater observation device.

The explanation will be made with reference to FIG. 3. The housing is fixed to both sides of the underwater observation device by three bolts. A thread 6 made of a thermoplastic resin is arranged from a start point housed in the housing, arranged to pass through electric heater portions 4, arranged to pass through a hole provided on a lower part of the housing, locked to a locking member 11 fixed on an upper surface of a weight support plate 8 located at the weight side, arranged to pass through another hole provided on the lower part of the housing, returned inside the housing and returned to an end point housed in the housing via the electric heater portions 4. A ring 12 for weight is provided on a lower surface of the weight support plate 8 and the weight is hung from the ring 12.

Here, the structure of a pair of electric heater portions 4 is shown in FIG. 8. Namely, the thread 6 made of the thermoplastic resin passes inside a housing tube 19 and a cylindrical insulator is provided on a center portion of the housing tube. In the cylindrical insulator, an electric heater coil is formed by winding a heating wire. When an electricity is conducted through the heating wire via terminals (connectors) for an electric heater, the electric heater coil generates heat and the thread made of the thermoplastic resin is melt-cut at the position of the electric heater coil (Patent document 6). When the thread is melt-cut, the thread is pulled out from the locking member 11 of the weight support plate, and an underwater observation device 1 is disconnected from the weight support plate. Thus, the underwater observation device 1 becomes free and floats on the water by its own buoyancy. Then, the underwater observation device 1 is collected. In the configuration shown in FIG. 3, only one locking member of the thread is provided on the upper surface of the weight support plate. Thus, the shape of the thread is V-shape when viewed from the side.

When the thread is formed in V-shape, a tensile force acting on the thread in the atmosphere is equal to a half of a mass M of the weight.

Furthermore, the present invention provides a weight release device for releasing a weight attached to an underwater observation device having buoyancy, the weight release device including: a housing fixed to the underwater observation device; a thread made of thermoplastic resin, a start point and an end point of the thread being housed in the housing; a first electric heater portion; a second electric heater portion; a weight support plate; a first locking member of the thread made of the thermoplastic resin provided on a lower surface of the housing, the number of the first locking member is n−1 (n≥2); a second locking member of the thread made of the thermoplastic resin provided on an upper surface of the weight support plate, the number of the second locking member is n (n≥2); and a ring for hanging the weight, wherein the thread made of the thermoplastic resin is arranged from the start point housed in the housing, arranged to pass through the first electric heater portion, arranged to alternately pass the first locking member of the thread made of the thermoplastic resin provided on the upper surface of the weight support plate and the second locking member of the thread made of the thermoplastic resin provided on the lower surface of the housing for sewing the first locking member and the second locking member together, arranged to pass through the second electric heater portion housed in the housing, and returned to the end point housed in the housing, the ring for hanging the weight is fixed to the lower surface of a weight support plate, the weight is hung from the ring, and the weight support plate from which the weight is hung is configured to be released only by conducting an electricity through the first electric heater portion and the second electric heater portion to melt-cut the thread made of the thermoplastic resin for floating the underwater observation device.

Regarding the case of n=2, FIG. 4 shows the case where one locking member of the thread made of the thermoplastic resin is provided on the lower surface of the housing of the underwater observation device and two locking members of the thread made of the thermoplastic resin are provided on the upper surface of the weight support plate. The housing is fixed to both sides of the underwater observation device 1 by three bolts. A start point and an end point of the thread made of the thermoplastic resin are housed in the housing. In an intermediate passage, electric heater portions 4 are provided on both the start point side and the end point side in the housing, two locking members are provided on the upper surface of the weight support plate, and one locking member is provided on the lower surface of the housing attached to the underwater observation device. As described above, the electric heater portions have the structure shown in FIG. 8. The thread made of the thermoplastic resin is melt-cut when an electricity is conducted. A ring 12 for weight is provided on the lower surface of the weight support plate 8 for hanging a weight 2 from the ring 12.

FIG. 5 is an enlarged view of a weight release device 3 shown in FIG. 4. The thread made of the thermoplastic resin extended from the start point is arranged to pass through the first electric heater portion 4, arranged to pass through a hole provided on a lower part of the housing, hooked on a first locking member 11 provided on the weight support plate 8 to change the direction upward, hooked on a locking member 10 provided on a lower surface of the housing attached to the underwater observation device to change the direction again, then hooked on a second locking member 11 provided on the weight support plate 8 to change the direction upward, arranged to pass through another hole provided on the lower surface of the housing the housing, returned inside the housing and returned to the end point via a second electric heater portion 4. In this case, the shape of the thread is W-shape (inverted M-shape) when viewed from the side. It is revealed from the calculation that a tensile force acting on the thread is even and the minimum when the angle θ (shown in FIG. 7A) of the thread with respect to a horizontal direction at a position of the locking member 10 located at the housing side is approximately 42±5 degrees. When the mass of the weight is M, the tensile force acting on the thread in the atmosphere is a quarter of the mass M of the weight. When the thread is tensioned (stretched) for sewing predetermined members with each other (i.e., the thread is tensioned in W-shape), the tensile force acting on the thread can be reduced in accordance with the principle of a pulley to a half compared to the case where the thread is tensioned by providing one locking member on the upper surface of the weight support plate (i.e., V-shape). Namely, the tensile force acting on the thread can be reduced in accordance with the principle of a pulley to a half by providing one locking member on the housing side, providing two locking members on the upper surface of the weight support plate and tensioning the thread for sewing them (i.e., the thread is tensioned in W-shape) compared to the case where the thread is tensioned by providing one locking member on the upper surface of the weight support plate (i.e., V-shape). When the volume of the underwater observation device is increased and the buoyancy is increased, it is necessary to increase the mass of the weight. The above described fact means that it is not necessary to increase the diameter of the thread 6 since the tensile force acted on the thread 6 can be reduced by tensioning the thread in W-shape. FIG. 6 shows the state that the thread 6 made of the thermoplastic resin is melt-cut after an electricity is conducted through the electric heater portion 4 from the state shown in FIG. 5. In the case where the weight 2 is landed on the sea bottom, the weight support plate 8 and attached components sink toward the weight while the underwater observation device 1, the housing and attached components float upward.

Similarly, regarding the case of n=3, FIG. 9 shows the case where two locking members are provided on the lower surface of the housing of the underwater observation device and three locking members are provided on the upper surface of the weight support plate. In this case, the shape of the thread is VVV-shape (triple V-shape) when viewed from the side. It is revealed from the calculation that a tensile force acting on the thread is even and the minimum when the angle θ of the thread with respect to the horizontal direction at a position of the locking member located at the housing side is approximately 49±5 degrees. When the mass of the weight is M, the tensile force acting on the thread in the atmosphere is one-sixth (M/6) of M in accordance with the principle of a pulley. Namely, the tensile force acting on the thread can be reduced to one-third by providing two locking members on the housing side, providing three locking members on the upper surface of the weight support plate and tensioning the thread for sewing them (i.e., the thread is tensioned in VVV-shape) compared to the case where the thread is tensioned by providing one locking member on the upper surface of the weight support plate (i.e., V-shape).

The above described situations will be generally expressed. When the number of the locking member provided on the upper surface of the weight support plate is n and the number of the locking member provided on the lower surface of the housing fixed to the underwater observation device is (n−1), the configuration shown in FIG. 3 is the case of n=1, the configuration shown in FIG. 5 is the case of n=2, and the configuration shown in FIG. 9 is the case of n=3. In the case of n=4, the tensile force acting on the thread is even and the minimum when the angle θ of the thread with respect to the horizontal direction at a position of the locking member located at the housing side is approximately 53±5 degrees and the tensile force is one-eighth (M/8) of M (i.e., 2n) when the mass of the weight is M. Namely, when the number of the locking member provided on the weight support plate is n, the tensile force acting on the thread can be reduced to M/2n by suitably adjusting the angle formed by the horizontal direction and the thread at the position of the locking member located at the housing side. The angle θ formed by the horizontal direction and the thread at the position of the locking member located at the housing side can be determined by expressing the tensile force acting on the thread by vector and evenly balancing the tensile force in the vertical direction, in the horizontal direction and at any positions. The angle θ formed by the horizontal direction and the thread at the position of the locking member located at the lower surface of the housing is $\sin\theta = n/(n+1)$ when expressed by the above described n. From a practical viewpoint, it is considered that the maximum value of n is 4.

Here, it is preferred that a plurality of guide supports is provided on the lower surface of the housing of the weight release device of the present invention, seat holes are provided on the upper surface of the weight support plate, and tips of the guide supports are fitted into the seat holes. Consequently, the load applied to the body of the underwater observation device and the weight in the horizontal direction caused by vibration and distortion can be prevented from being applied to the thread made of the thermoplastic resin. When the thread made of the thermoplastic resin is melt-cut for releasing the weight, the tips of the guide supports are pulled out of the seat holes of the weight support plate without receiving resistance. Thus, the underwater observation device can float upward.

The above described guide supports are the member to which reference numeral 7 is assigned in FIGS. 3 to 7A, FIG. 7B and FIG. 9. In general, it is preferred to provide four guide supports. However, it is also possible to provide two or three guide supports. The above described seat holes formed on the upper surface of the weight support plate are the member to which reference numeral 9 is assigned in FIG. 7B. The guide supports are not screwed into the seat holes. The tips of the guide supports are merely fitted into the seat holes.

The above described explanation will be summarized using FIG. 7A. A weight release device 3 of the present invention is installed between the underwater observation device 1 and the weight 2. The weight release device 3 is connected with the body of the underwater observation device via the housing. The weight is hung from the ring 12 for weight. The thread 6 made of the thermoplastic resin for hanging the weight 2 and the weight support plate 8 is arranged inside the housing from a start points 15, arranged to path through the electric heater portion 4, drawn out of the housing, hooked on the first locking member 11 of the weight side to change the direction, hooked on the locking member 10 provided on the lower surface of the housing to change the direction again, hooked on the second locking member 11 of the weight support plate to change the direction, drawn into the housing again, arranged to pass through the second electric heater portion 4 and fixed to an end point 15. Note that the angle θ formed by the horizontal direction and the thread 6 at the position of the locking member 10 located at the lower surface of the housing. When collecting the underwater observation device, an electricity is conducted through the electric heater portion 4 to melt-cut the thread 6 made of the thermoplastic resin by the heat of an electric heater coil 20. When the thread 6 is melt-cut by the electric heater portion, the tensile force of the thread 6 disappears. Thus, the underwater observation device 1 and the housing are separated from the weight support plate 8 for hanging the weight 2. The tips of the guide supports 7 are pulled out of the weight support plate without receiving resistance from the seat holes 9. Thus, the underwater observation device and the housing float on the water surface by the buoyancy. On the other hand, the weight support plate 8 sinks toward the weight side (downward).

Since a pair of electric heater portions is provided on the start point side and the end point side, even when the thread is not melt-cut by one of the electric heater portions due to the trouble of the electric signal, the thread can be melt-cut by the other of the electric heater portions. Namely, safety factor is considered. Even if the possibility of occurring the case where the electric heater is not operated and the thread is not melt-cut is approximately one-tenth (1/10), the possibility of occurring the case where two electric heaters are not operated is reduced to one-hundredth (1/100). Note that the signal for instructing the release of the weight is transmitted from a transponder device, a timer or the like equipped with the body of the exploration device to a terminal (connector) 16 for an electric heater of the electric heater portion 4 through the underwater cable.

The locking member provided on the lower surface of the housing and the locking member provided on the upper surface of the weight support plate are preferably an eye bolt on which screw groove is formed over the whole length of the eye bolt. The effective length (length from the surface) of the eye bolt can be adjusted by the position of a nut attached to a screw member. The angle of the thread from the horizontal direction at the position of the eye bolt of the housing side can be adjusted by adjusting the effective length of the eye bolt. The guide supports can be suitably fitted by arranging the guide supports at the positions of the seat holes of the weight support plate in advance and then adjusting the position of the eye bolt of the weight support plate.

Effects of the Invention

When the weight release device of the present invention is used, only by melt-cutting the thread made of the thermoplastic resin for hanging the weight by an electric heater, the underwater observation device and the weight are directly separated from each other without requiring the mechanical operation at all. Thus, the underwater observation device can be floated on the water surface. Even when the underwater observation device becomes large and the mass of the weight is increased, it is not required to increase the diameter of the thread for enhancing the strength of the thread. Thus, the thread can be melt-cut surely.

The weight release device of the present invention is smaller and more compact compared to the conventional weight release devices and commercially available acoustic underwater release devices. In addition, the weight release device of the present invention is smaller and more compact compared to a cantilever-type weight release device conventionally used by the inventors of the present invention.

Furthermore, the weight release device of the present invention can be also used in deep sea of the depth of 4,000 m or more as shown in the later described examples similar to the conventional cantilever-type (FIG. 2).

MODES FOR CARRYING OUT THE INVENTION

Figure 1:
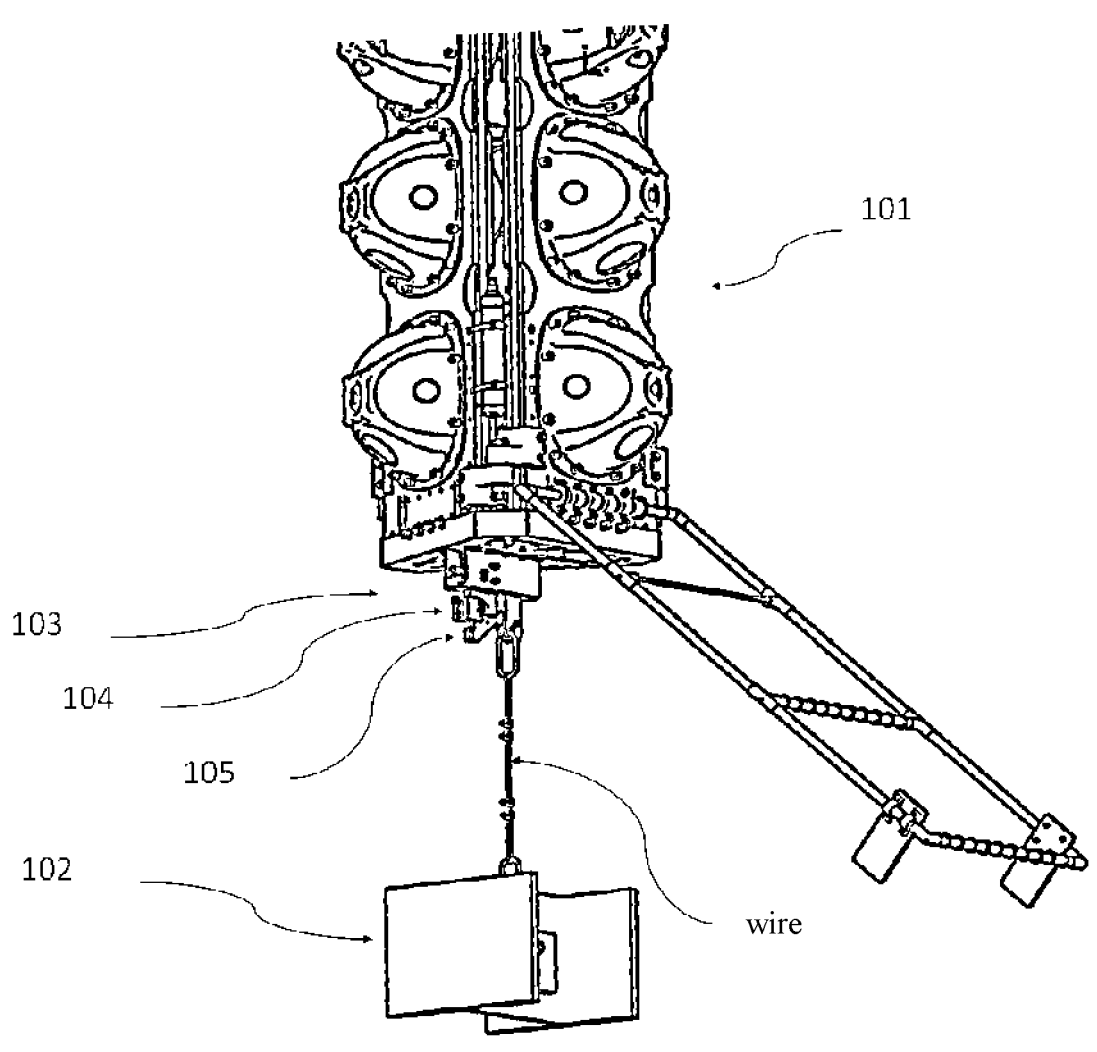
FIG. 1 is an explanation drawing of a conventional underwater observation device, weight release device and weight.
Figure 2:
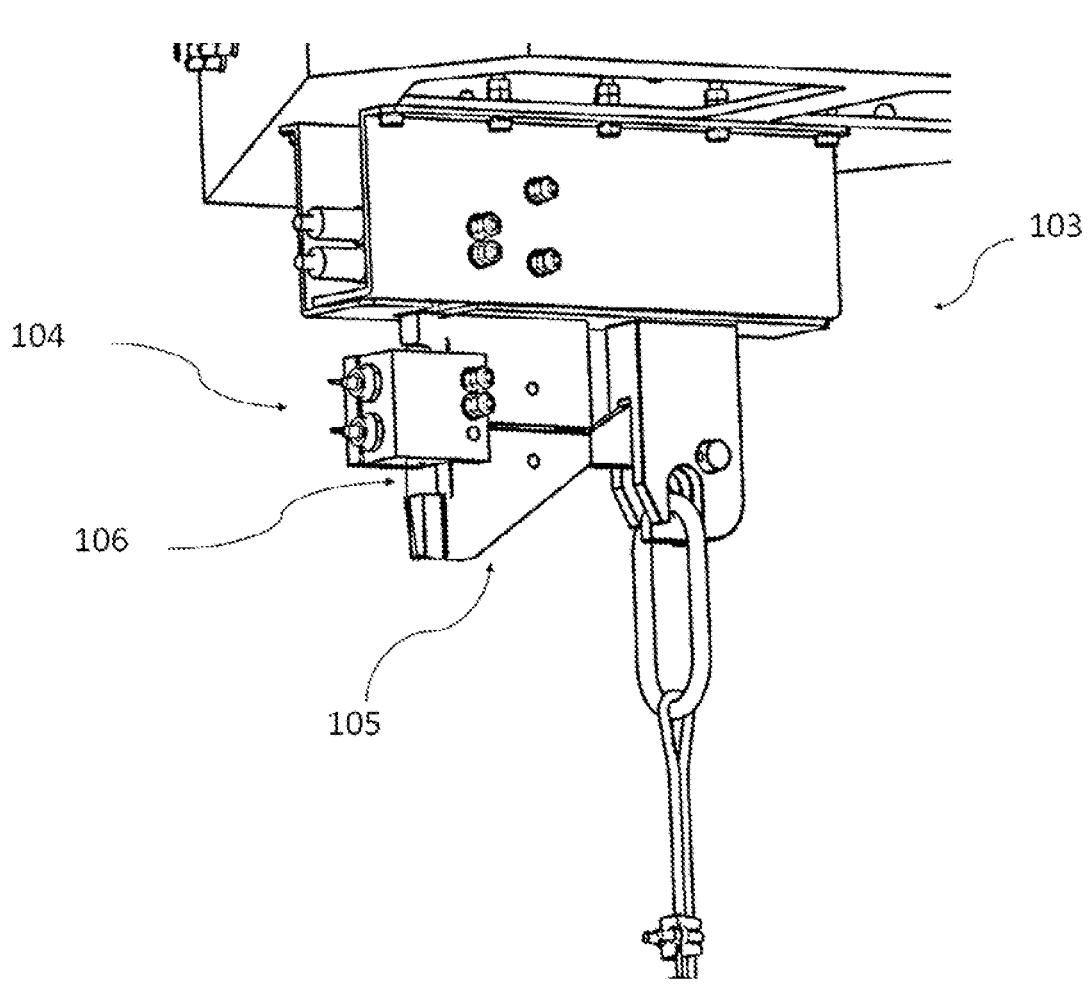
FIG. 2 is an enlarged view of the conventional weight release device.

The underwater observation device used in the present invention is not limited to an underwater/seabed observation device named as a so-called "Edokko-1" (Non-Patent Document 1) and a connectedly-formed underwater exploration device (Patent document 2 and Patent document 3) formed by connecting a plurality of "Edokko-1" enabling to perform an ecological impact survey by monitoring images for a long time. The weight release device of the present invention can be applied to any underwater observation devices having the buoyancy by fixing the housing to the underwater observation device. Furthermore, the present invention can be also used for collecting various components used as a part of the mooring system without being limited to the underwater observation device and the float.

The weight necessarily has the mass approximately same as the buoyancy of the underwater observation device or the mass heavier than the buoyancy of the underwater observation device. When the mass of the weight is approximately same as the buoyancy of the underwater observation device, the underwater observation device continues to stay in the water and the observation can be performed in a floating state. When the mass of the weight is heavier than the buoyancy of the underwater observation device, the underwater observation device sinks downward by the load subtracting the buoyancy of the underwater observation device from the mass of the weight. In a viewpoint of shortening the installation time, the descending speed is preferably a free fall speed. However, if the load subtracting the buoyancy of the underwater observation device is too large, an impact force applied to the underwater observation device when reaching the seabed is large. Thus, the devices included in the underwater observation device may be damaged. Accordingly, the mass of the weight is suitably the weight obtained by adding 10 kg to 30 kg to the buoyancy in general. In this case, the underwater observation device descends in the water at the speed of approximately 1 m/sec. When the seabed is observed by the underwater observation device, it is desired to increase the mass of the weight or adopt the structure like an anchor to withstand the tide of the environment of the seabed.

As for the material of the thread made of the thermoplastic resin, various commercially available materials such as polyethylene, nylon, fluorocarbon, polyester and polypropylene can be used. Since the thickness of the thread is various (No. 0.1 to 200), and the standard tensile strength (load resistance) is various (0.1 kg to 360 kg) depending on the material and the thickness, suitable thread can be selected and used. In general, the standard tensile strength is No.×(3 to 4)×1 lb. (454 g). Since the softening temperature is approximately 120° C. to 180° C., the thread can be easily melt-cut by the heat generated by the electric heater coil inside the electric heater portion.

When the number of the locking members provided on the upper surface of the weight support plate is n and the number of the locking members fixed to the lower surface of the housing of the underwater observation device is (n−1), the tensile force acting on the thread is even and the minimum when the angle $\theta$ formed by the horizontal direction and the thread at a position of the locking member located at the lower surface of the housing satisfies $\sin \theta = n/(n+1)$. In addition, when the mass of the weight is M, the tensile force in the atmosphere is M/2n (here, n≥2). Accordingly, even when the material and thickness of the thread made of the thermoplastic resin is the same, the load resistance can be substantially enhanced by increasing the number n of the locking members.

Figure 7A:
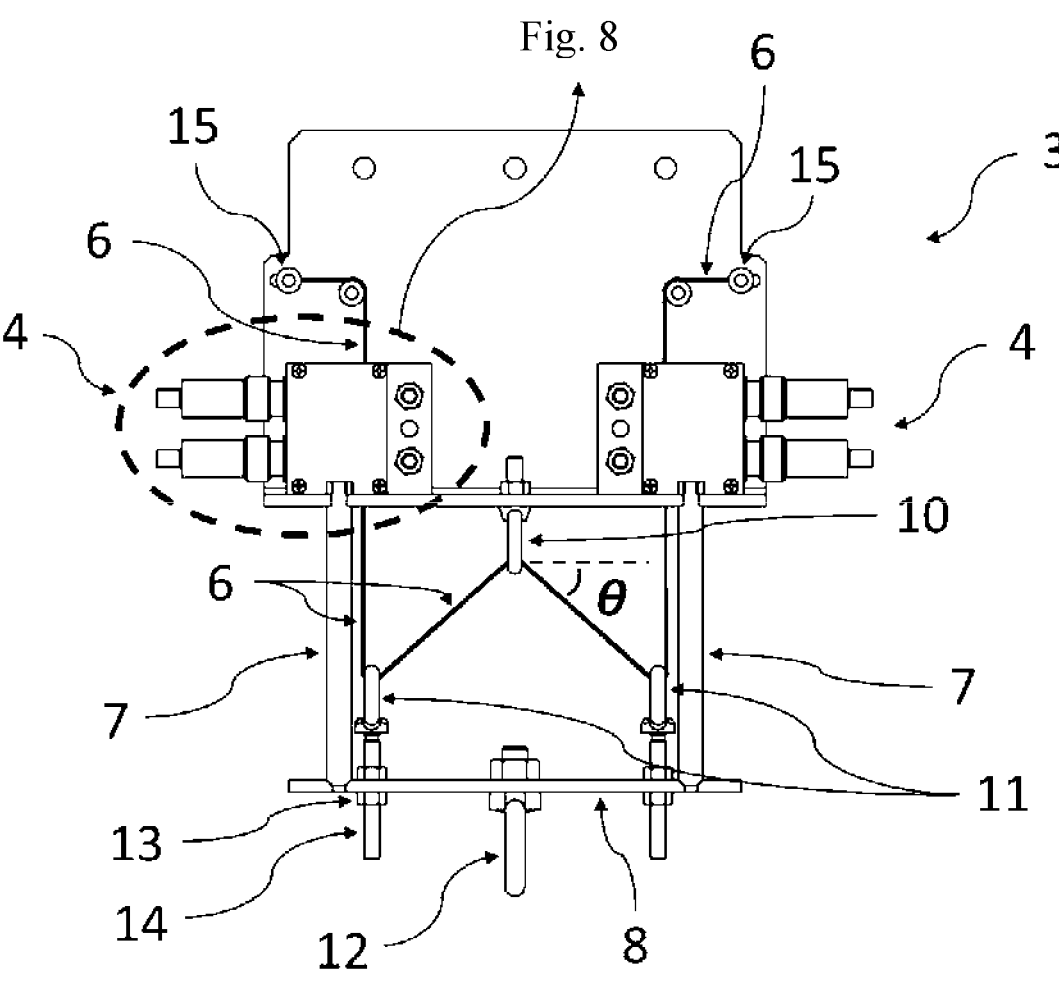
FIG. 7A is a drawing showing the second type (W-shape) of the weight release device of the present invention before the weight is released.
Figure 7B:
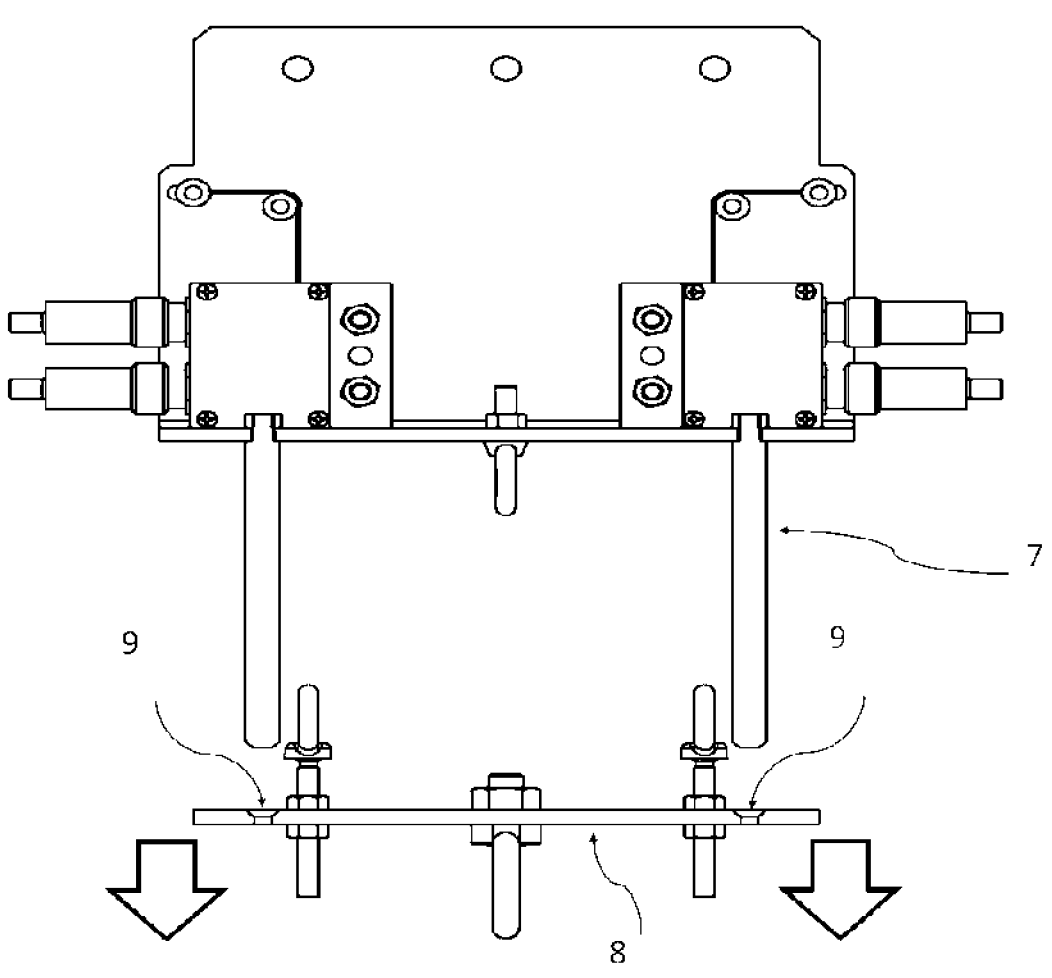
FIG. 7B is a drawing showing the second type (W-shape) of the weight release device of the present invention after the weight is released.
Figure 8:
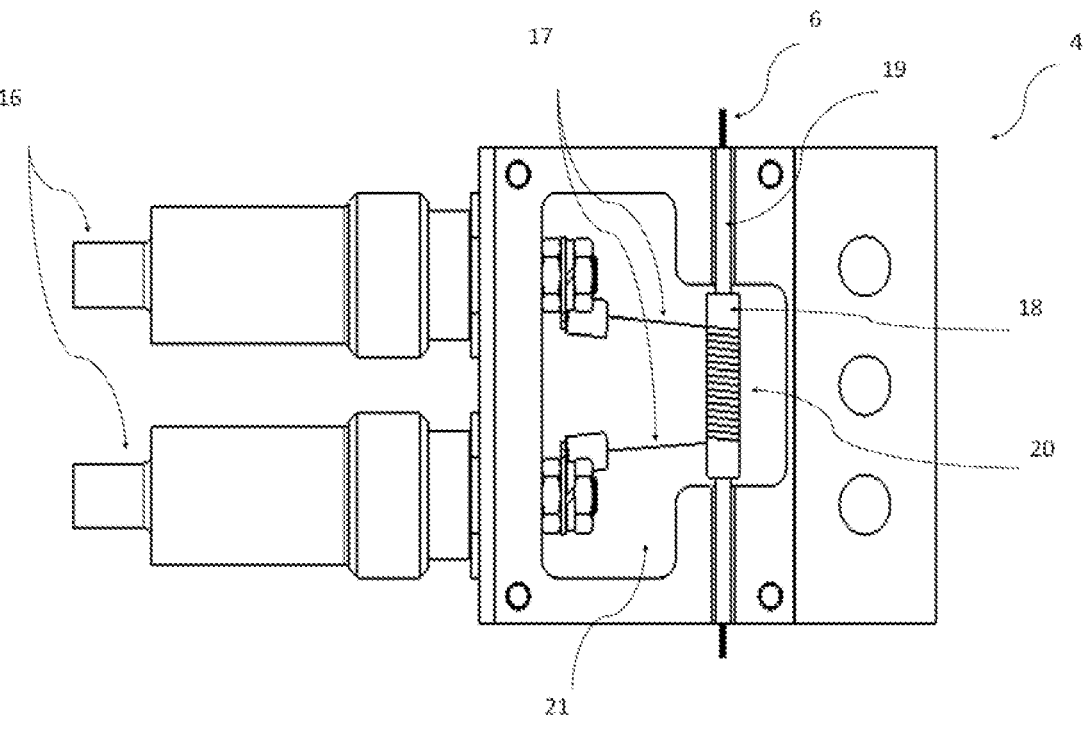
FIG. 8 is a detail drawing of an electric heater portion used for the weight release device of the present invention.

Here, the number n of the locking members of the upper surface of the weight support plate, $\sin \theta$, $\theta(°)$ and the tensile force acting on the thread in condition that the mass of weight is M are shown in Table 1. From a practical viewpoint, it is considered that the maximum value of n is 4. The value of $\theta$ shown in Table 1 is the theoretical value obtained by the calculation. For practical use, it is enough if the value of $\theta$ is within the range of $\theta \pm 5°$. The angle $\theta$ formed by the horizontal direction and the thread at the position of the locking member located at the lower surface of the housing is exemplified in FIG. 7A (before release).

TABLE 1

Figure 3:
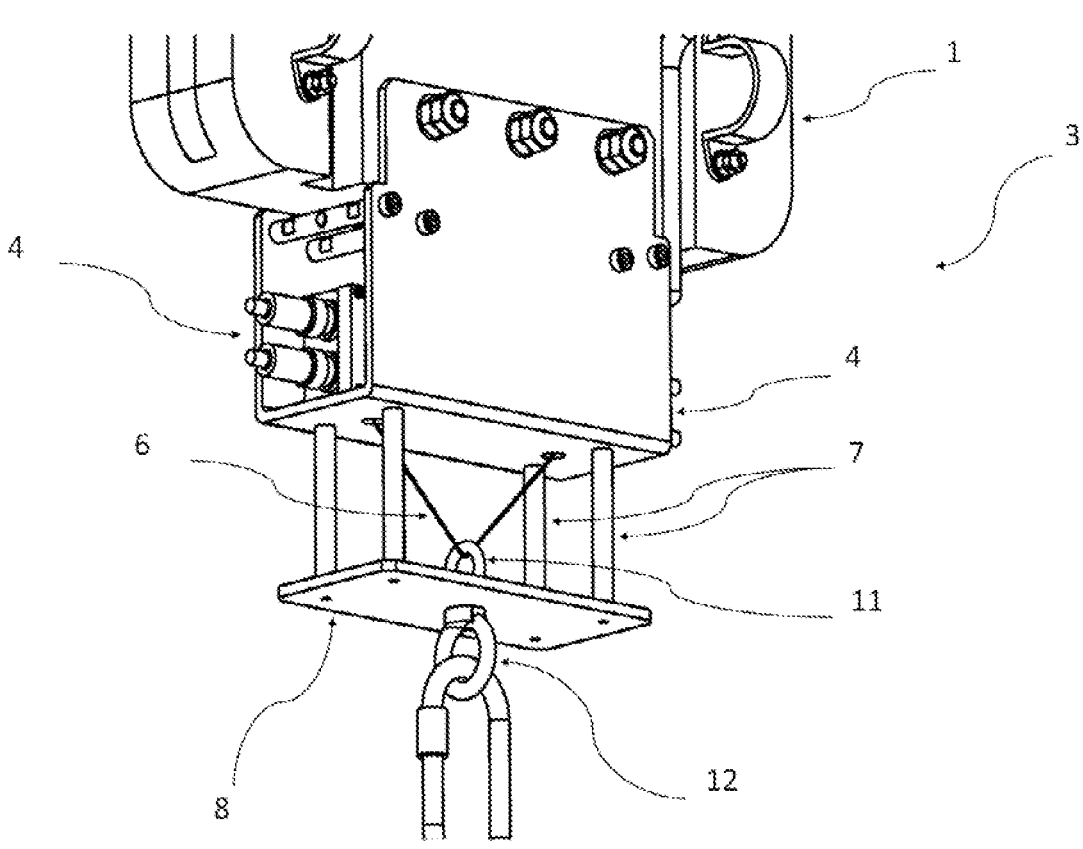
FIG. 3 is an explanation drawing of the first type (V-shape) of the weight release device of the present invention.
Figure 4:
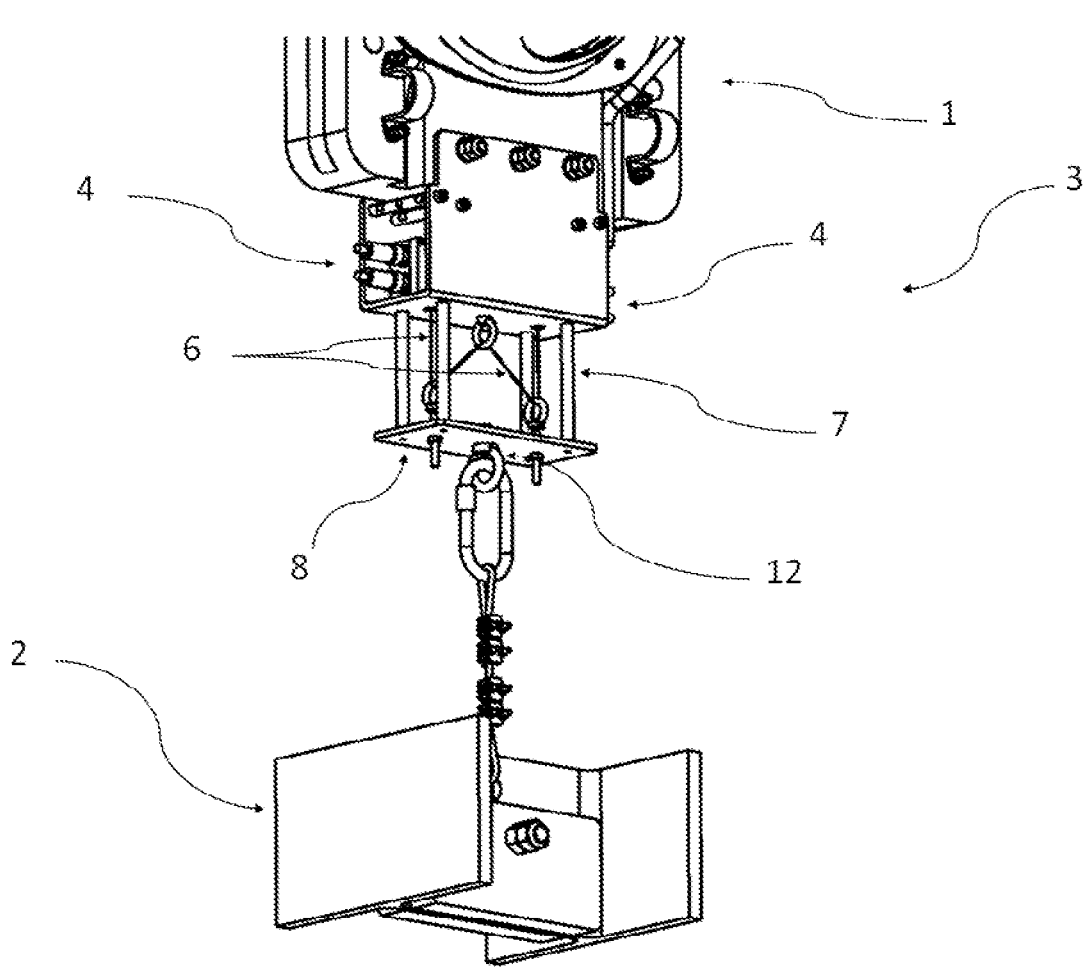
FIG. 4 is a connection drawing between a second type (W-shape) of the weight release device of the present invention and the weight.
Figure 5:
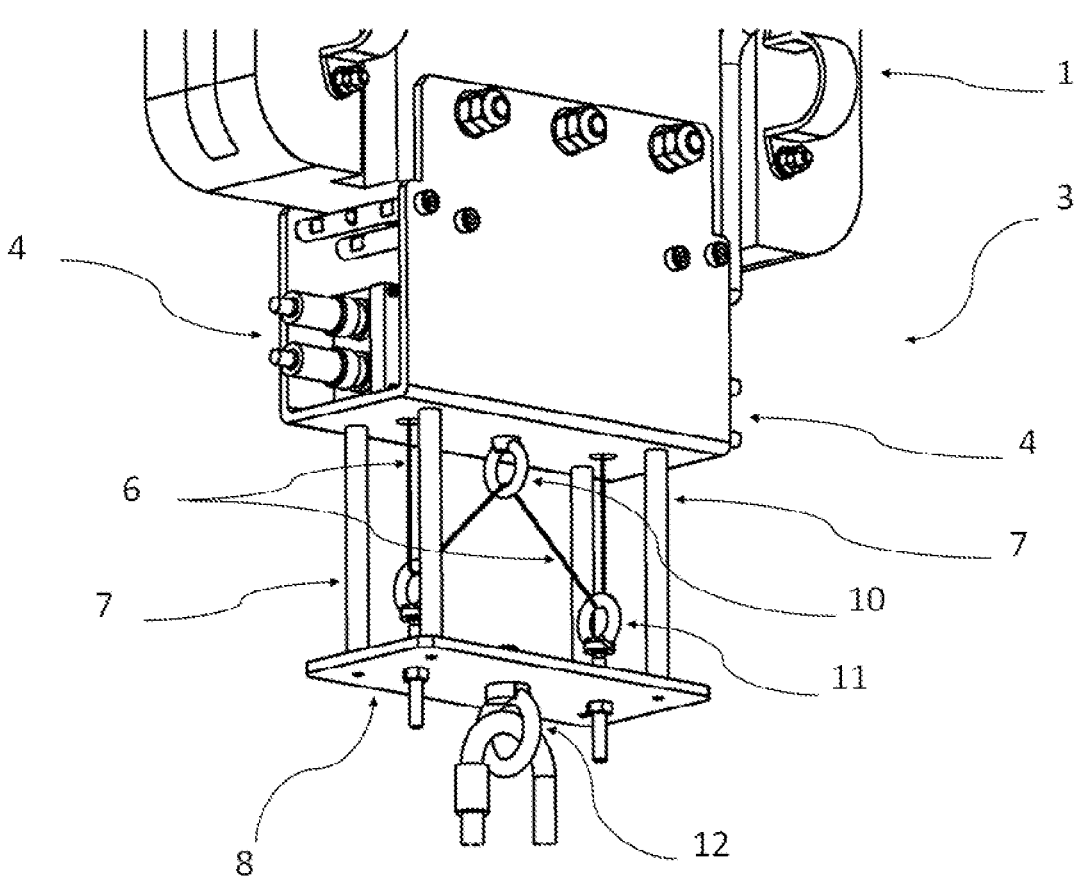
FIG. 5 is an explanation drawing of the second type (W-shape) of the weight release device of the present invention.
Figure 6:
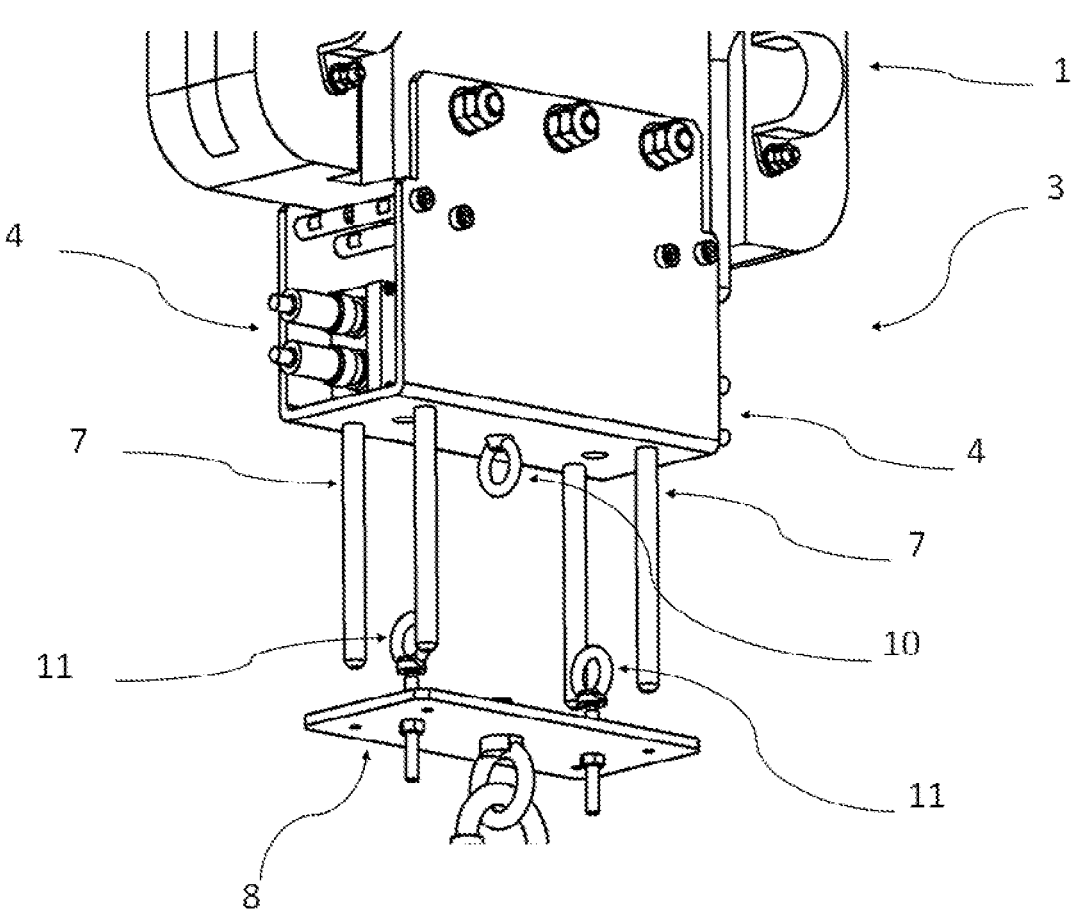
FIG. 6 is an explanation drawing of the second type (W-shape) of the weight release device of the present invention (showing a state after the thread made of the thermoplastic resin is melt-cut).
Figure 9:
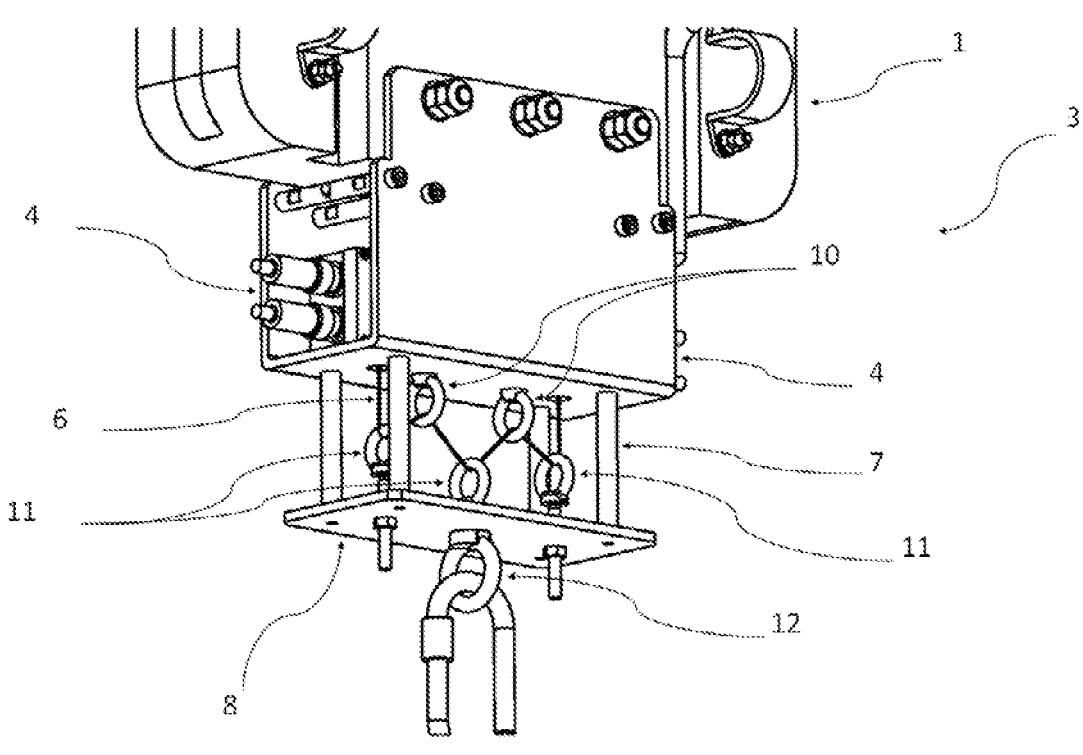
FIG. 9 is an explanation drawing of the third type (VVV-shape) of the weight release device of the present invention.

| | number n of locking member on upper surface of weight support plate | | | |
| --- | --- | --- | --- | --- |
| | 1 | 2 | 3 | 4 |
| shape of thread | V-shape | W-shape | VVV-shape | VVVV-shape |
| drawing to be referred | FIG. 3 | FIG. 5 | FIG. 9 | not illustrated |

TABLE 1-continued

| | number n of locking member on upper surface of weight support plate | | | |
| | --- | --- | --- | --- |
| | 1 | 2 | 3 | 4 |
| sin θ | — | 2/3 | 3/4 | 4/5 |
| θ (°) | — | 42 | 49 | 53 |
| tensile force acting on the thread | M/2 | M/4 | M/6 | M/8 |

First Example (Release of Glass Sphere Float)

Figure 10:
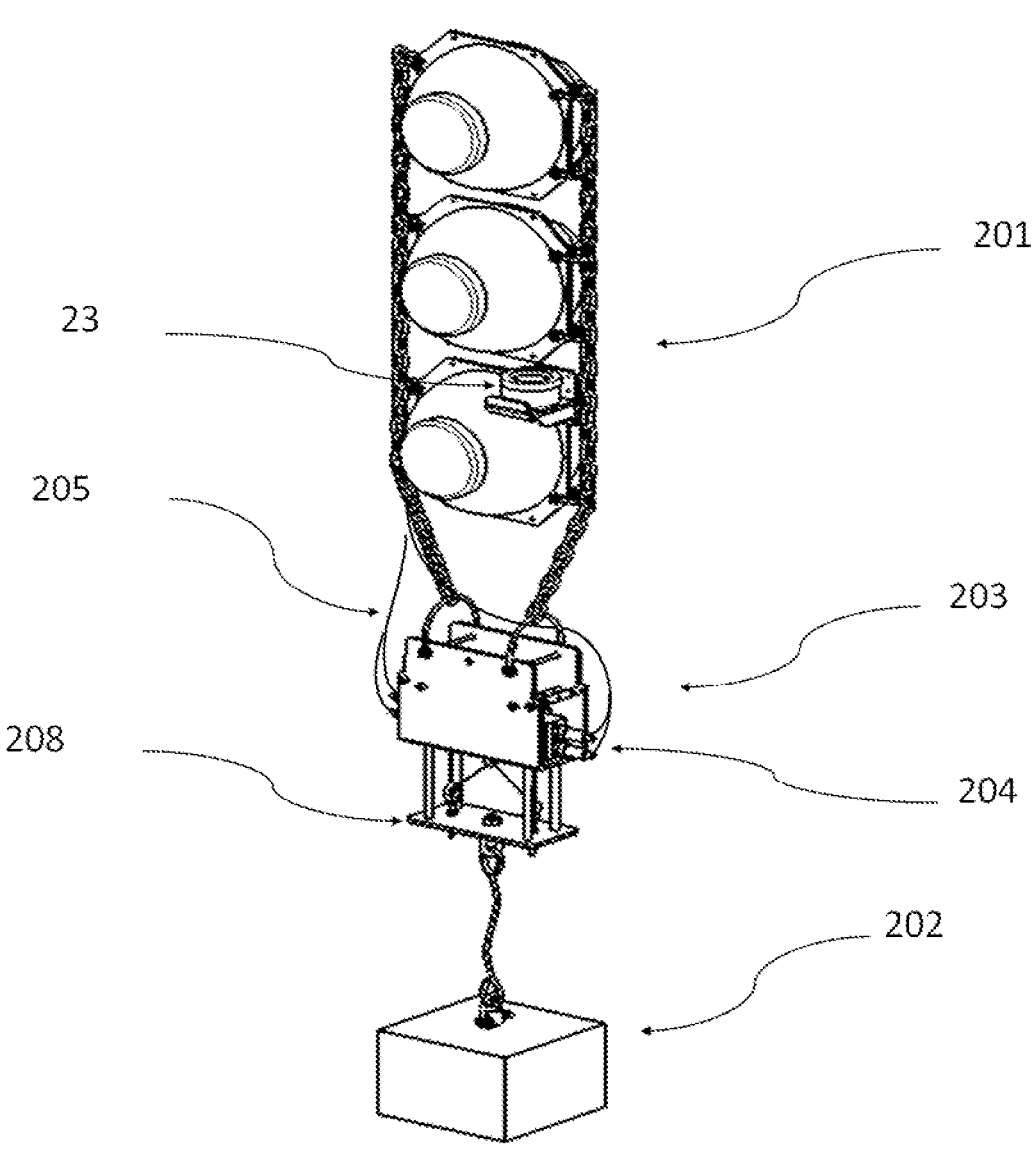
FIG. 10 is an explanation drawing showing the configuration of the first example.

A glass sphere float is mainly used for the purpose of floating a small underwater observation device or the like by using a buoyancy of the glass sphere float. In general, for achieving the above described purpose, a glass sphere float, an observation device, a release device and a weight are continuously connected with each other in this order from above. In the present example, the observation device is omitted and the example of directly hanging the weight from the glass sphere float via the release device will be explained below using FIG. 10. As described above, when the observation is finished, the operation of releasing the weight from the observation device is required for collecting the data and other purposes. Here, three pressure-resistant hollow glass spheres having a diameter of 13 inches were connected to each other by a chain to form a glass sphere float 201. The buoyancy of the pressure-resistant hollow glass sphere having a diameter of 13 inches is approximately 10 kg per one sphere and 30 kg for three spheres in the sea. A weight 202 was directly hung while omitting the observation device and the mass of the weight 202 is 40 kg. The weight 202 was connected to the glass sphere float 201 via a release device 203 as shown in FIG. 10. The thread made of polyethylene (four-thread knitting, No. 15, diameter: 0.64 mm) was used for the release device. The standard tensile strength (load resistance) of the polyethylene thread (four-thread knitting, No. 15) is 80 kg.

A totally 70 kg of the tensile force is acted on the polyethylene thread (four-thread knitting) by the mass 40 kg of the weight 202 and the buoyancy 30 kg of the glass sphere float 201. Therefore, if the glass sphere float 201 was directly connected with the weight 202 only by one poly-ethylene thread (four-thread knitting), tensile strength of the polyethylene thread (four-thread knitting) had only 10 kg of margin. Thus, the thread might be easily cut when additional load was acted by the change of the environment. Accordingly, as shown in FIG. 10, the polyethylene thread (four-thread knitting) was connected in a W-shape using the locking members. Thus, the tensile force acting on the thread was reduced to one-fourth (approximately 18 kg) and the glass sphere float 201 could be stably moored. The above described device was installed on the seabed in the water depth of 330 m by free fall. When a release signal was transmitted from an acoustic device on a ship for collecting the glass sphere float 201, an electricity was conducted from a transponder (not illustrated) installed in the hollow glass sphere to the electric heater portion 204 through an underwater cable 205. Then, the heat was generated in the electric heater coil installed in the electric heater portion and the polyethylene thread (four-thread knitting) was cut by the heat. From the distance between the acoustic reception apparatus mounted on the ship and an acoustic reception apparatus 23 installed in the glass sphere float, it was actually observed that the polyethylene thread was melt-cut after approximately 17 seconds after conducting electricity, the weight support plate and attached components fell down towards the weight 202, the glass sphere float 201 came to the sea surface after approximately 5 minutes, and the glass sphere float could be collected after approximately 5 minutes.

Second Example (Release of Edokko-1)

Figure 11:
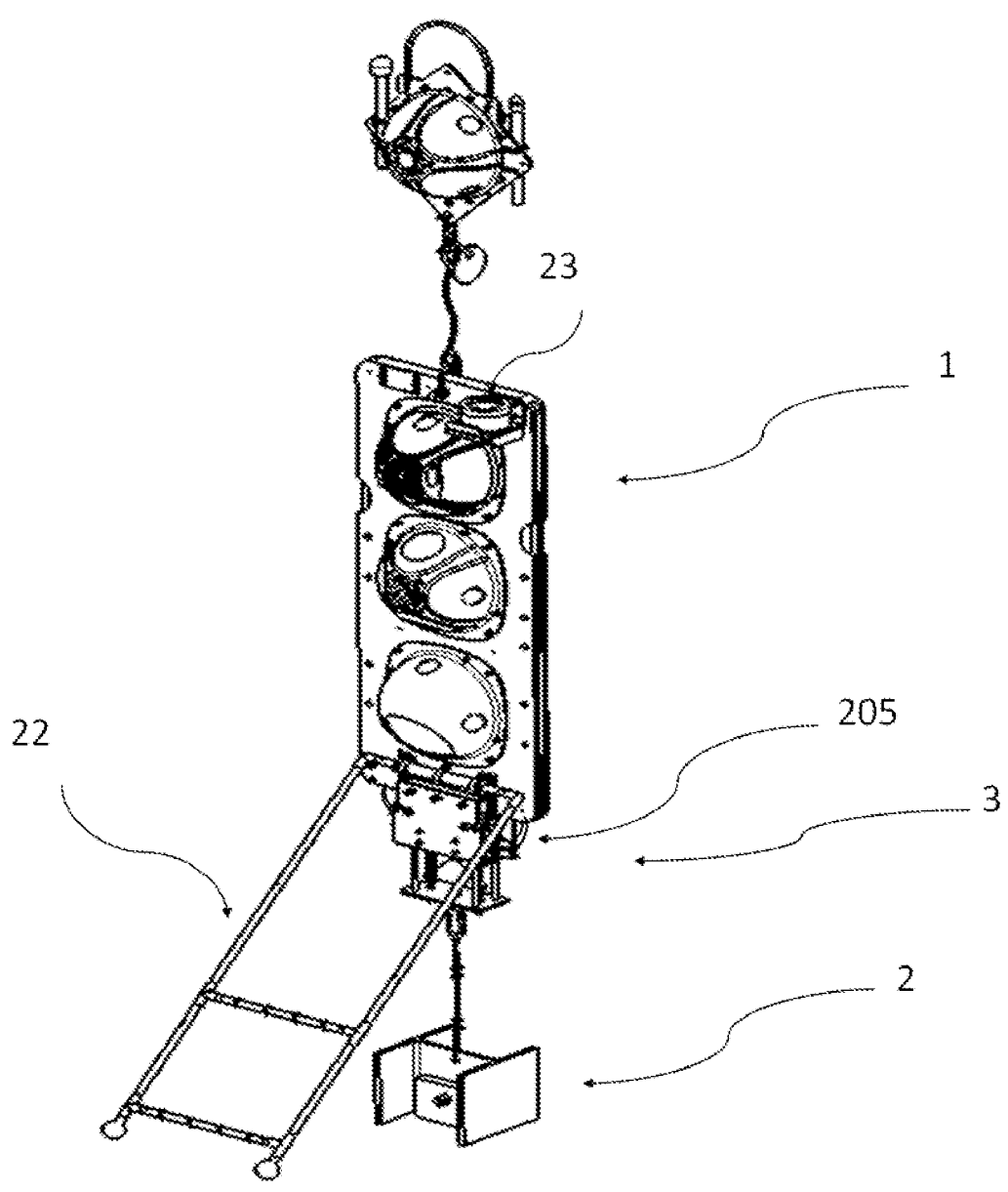
FIG. 11 is an explanation drawing showing the configuration of the second example.

The explanation will be made below using FIG. 11. The underwater observation device 1 is an undersea/seabed exploration device named "Edokko-1" used mainly for illuminating the seabed and photographing the seabed. The purpose of the underwater observation device is to perform a time lapse photographing in the sea for photographing fishes and crustaceans. Thus, change of submarine environment is grasped and environment evaluation is enabled. The underwater observation device 1 is formed by three pres-sure-resistant hollow glass spheres (photograph sphere, illu-mination sphere, transponder sphere) having a diameter of 13 inches. A communication sphere including a GPS and the like is connected to an upper part of the underwater obser-vation device 1. The buoyancy of the underwater observa-tion device is approximately 18 kg. An arm 22 is configured to contact the seabed when landing on the seabed for preventing the rotation of the underwater observation device and measuring the length of the living things approached to the arm 22. The thread made of polyethylene (four-thread knitting, No. 15) was used for the release device. The standard tensile strength (load resistance) of the polyethyl-ene thread (four-thread knitting, No. 15) was 80 kg. A totally 58 kg of the tensile force is acted on the polyethylene thread (four-thread knitting) by the mass 40 kg of the weight 2 and the buoyancy 18 kg of the underwater observation device 1. In addition, the mass of the underwater observation device in the air is approximately 80 kg. Thus, a large load may be applied on the release device 3 by the contact during the transportation. If the underwater observation device 1 was directly connected with the weight 2 only by one polyeth-ylene thread (four-thread knitting), the thread might be easily cut when additional load was acted by the change of the environment. Accordingly, as shown in FIG. 11, the polyethylene thread (four-thread knitting) was connected in a W-shape using the locking members. Thus, the tensile force acting on the thread was reduced to one-fourth (ap-proximately 15 kg) and the underwater observation device 1 could be stably moored. When the polyethylene thread (four-thread knitting) was connected in W-shape, the poly-ethylene thread can bear the load force of approximately 320 kg which was four times as great as the standard tensile strength (load resistance). Thus, even when approximately 80 kg of the mass of the underwater observation device was acted on the thread in the air, the thread was not cut and the release device was not broken. The underwater observation device 1 was installed on the seabed in the water depth of 6000 m by free fall and the seabed was observed for three hours. When a release signal was transmitted from an acoustic device on a ship for collecting underwater obser-vation device 1, an electricity was conducted from a tran-sponder installed in the hollow glass sphere to the electric heater portion through an underwater cable 205. Then, the heat is generated in the electric heater coil installed in the electric heater portion and the polyethylene thread (four-thread knitting) was cut by the heat. From the distance between the acoustic reception apparatus mounted on the ship and an acoustic reception apparatus 23 installed in the underwater observation device, it was actually observed that the polyethylene thread was melt-cut after approximately 17 seconds after conducting electricity, the weight support plate and attached components fell down towards the weight 2, the underwater observation device 1 came to the sea surface after approximately 2 hours, and the underwater observation device 1 could be collected after approximately 20 minutes.

DESCRIPTION OF THE REFERENCE NUMERALS

1, 101: underwater observation device
201: glass sphere float
2, 102, 202: weight
3, 103, 203: weight release device
4, 104, 204: electric heater portion
105: cantilever
205: underwater cable
6, 106: thread made of thermoplastic resin
7: guide support
8, 208: weight support plate
9: seat hole for guide support
10: locking member of lower surface of housing (for locking thread made of thermoplastic resin)
11: locking member of upper surface of weight support plate (for locking thread made of thermoplastic resin)
12: ring for weight
13: nut (for adjusting vertical positon of locking member)
14: eye bolt
15: fixing terminal (start point and end point) of thread made of thermoplastic resin
16: terminal (connector) for an electric heater
17: heating wire
18: cylindrical insulator (housing tube passing through center of cylindrical insulator and thermoplastic resin thread passing thorough center of housing tube)
19: housing tube of thread made of thermoplastic resin
20: electric heater coil
21: insulated waterproof silicon
22: arm
23: acoustic reception apparatus

What is claimed is:

1. A weight release device for releasing a weight attached to an underwater observation device having buoyancy, wherein the weight release device comprising:

a housing fixed to the underwater observation device;

a thread made of thermoplastic resin, a start point and an end point of the thread being housed in the housing;

a first electric heater portion;

a second electric heater portion;

a weight support plate;

a locking member for locking the thread made of the thermoplastic resin; and a ring for hanging the weight, the thread made of the thermoplastic resin is arranged from the start point housed in the housing, arranged to pass through the first electric heater portion, locked to the locking member for locking the thread made of the thermoplastic resin, arranged to pass through the second electric heater portion housed in the housing, and returned to the end point housed in the housing, the locking member being provided on an upper surface of the weight support plate, the ring for hanging the weight is fixed to a lower surface of the weight support plate, the weight is hung from the ring, and the weight support plate from which the weight is hung is configured to be released only by conducting an electricity through the first electric heater portion and the second electric heater portion to melt-cut the thread made of the thermoplastic resin for floating the underwater observation device.

2. A weight release device for releasing a weight attached to an underwater observation device having buoyancy, the weight release device comprising:

a housing fixed to the underwater observation device;

a thread made of thermoplastic resin, a start point and an end point of the thread being housed in the housing;

a first electric heater portion;

a second electric heater portion;

a weight support plate;

a first locking member for locking the thread made of the thermoplastic resin, the first locking member being provided on a lower surface of the housing, the number of the first locking member is n−1 (n>2);

a second locking member of for locking the thread made of the thermoplastic resin, the second locking member being provided on an upper surface of the weight support plate, the number of the second locking member is n (n>2); and a ring for hanging the weight, wherein the thread made of the thermoplastic resin is arranged from the start point housed in the housing, arranged to pass through the first electric heater portion, arranged to alternately pass the first locking member for locking the thread made of the thermoplastic resin provided on the upper surface of the weight support plate and the second locking member for locking the thread made of the thermoplastic resin provided on the lower surface of the housing for sewing the first locking member and the second locking member together, arranged to pass through the second electric heater portion housed in the housing, and returned to the end point housed in the housing, the ring for hanging the weight is fixed to a lower surface of the weight support plate, the weight is hung from the ring, and the weight support plate from which the weight is hung is configured to be released only by conducting an electricity through the first electric heater portion and the second electric heater portion to melt-cut the thread made of the thermoplastic resin for floating the underwater observation device.

3. The weight release device according to claim 1, wherein two to four guide supports are provided on a lower surface of the housing in a vertical direction, and tips of the two to four guide supports are fitted into seat holes formed on the upper surface of the weight support plate without being fixed to the weight support plate.

4. The weight release device according to claim 2, wherein an angle θ formed by a horizontal direction and the thread at a position of the locking member for locking the thread made of the thermoplastic resin provided on the lower surface of the housing is within a range of θ±5 degrees, $$\sin\theta = n/(n+1),$$

16 and n is the number of the first locking member for locking the thread made of the thermoplastic resin provided on the upper surface of the weight support plate.

* * * * *